Oct. 1, 1963
R. GABBIONETA
3,105,445
MEANS FOR SECURING THE ROTOR ON TO ITS
SHAFT IN A PUMP FOR FLUIDS
Filed Jan. 30, 1962
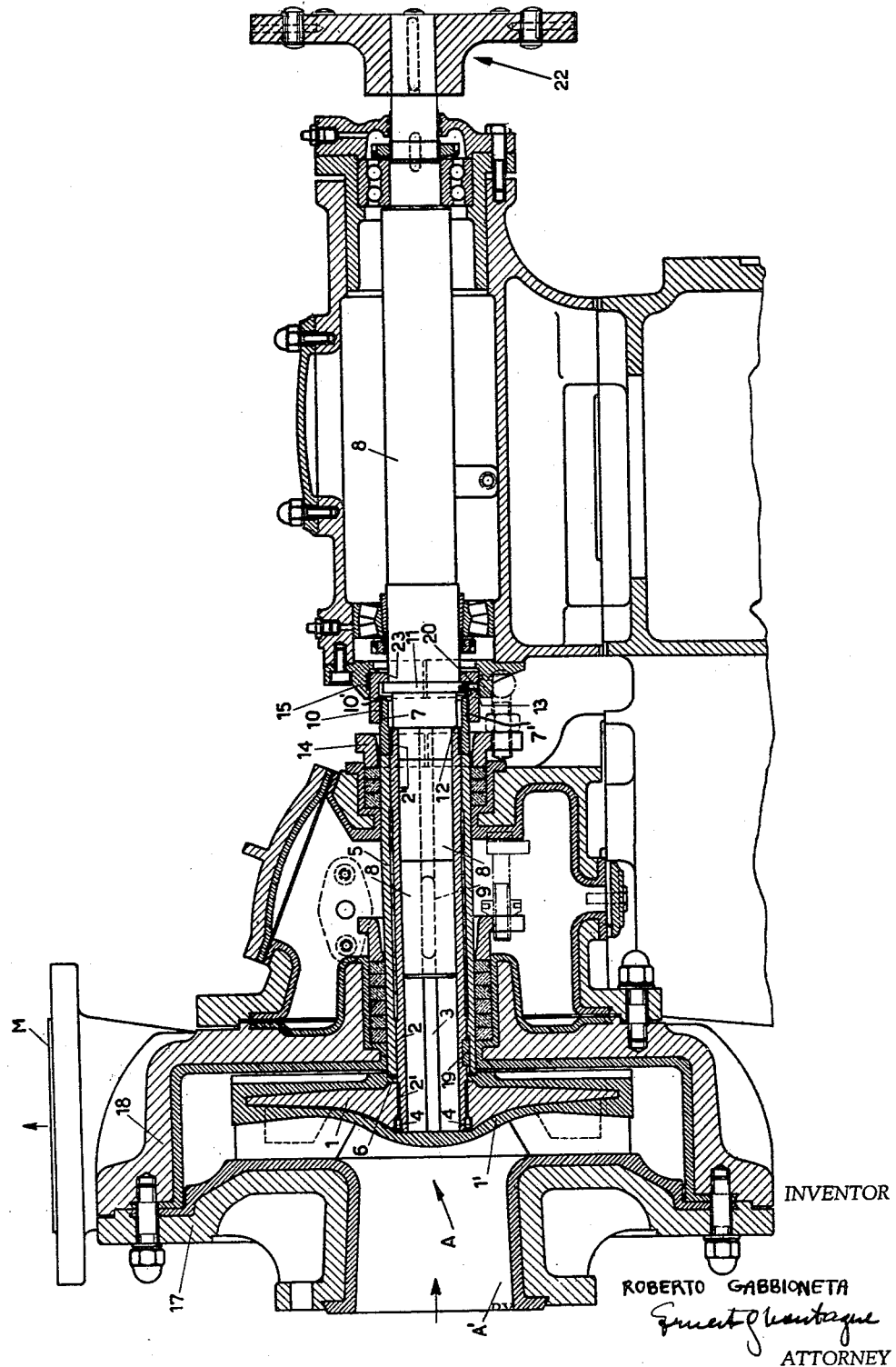
INVENTOR
ROBERTO GABBIONETA
ATTORNEY

United States Patent Office 3,105,445
Patented Oct. 1, 1963

3,105,445
MEANS FOR SECURING THE ROTOR ON TO ITS SHAFT IN A PUMP FOR FLUIDS
Roberto Gabbioneta, Via L. Gasparotto 4, Milan, Italy
Filed Jan. 30, 1962, Ser. No. 169,854
Claims priority, application Italy Feb. 17, 1961
7 Claims. (Cl. 103—114)

The present invention relates to a pump for fluids and, in particular, a pump of the type which comprises a rotor provided with a protective coating of plastic material.

As is known, in pumps with rotors provided with protective coatings, e.g. with their rotors coated with ebonite, the coating of said rotor and of other parts of the pump serves to preserve those metal parts, such as the core of the rotor itself, which would otherwise very soon be irremediably damaged by the fluid being pumped, containing corrosive substances.

In pumps of this nature, a problem of no little difficulty lies in how best to secure the rotor to the supporting and driving shaft thereof, as it is not only necessary to secure these parts firmly together, but it is also necessary to provide a seal at the free edge of the ebonite coating of the rotor in order to prevent infiltrations of said corrosive liquid.

There are known systems for securing the rotor to the shaft, but these systems present some considerable drawbacks.

According to one of said systems, the rotor is screwed on to the shaft of the pump, but this system, although it is relatively simple to apply, notoriously involves certain obstacles to good power transmission.

In a pump of this kind, if, for any reasons, the shaft of the pump were to rotate in the opposite direction to that of normal operation, the rotor would become unscrewed from the shaft.

According to another fastening system of known type, the rotor is secured to the shaft by means of a suitable tension rod housed inside the bore of the shaft.

This system employing such tension rod does provide a certain reliability of fastening of the rotor, but it presents several drawbacks such as, for example, the fact that there is unwanted play between the tension rod and the surface of the axial bore wherein the tension rod is situated, and the fact that the stripping of the rotor requires fairly complicated operations.

It is, therefore, one object of the present invention, to provide means for securing a rotor to a shaft, such as to obtain a reliable fastening without the drawback of the kind hereinabove mentioned.

It is another object of the present invention, to provide means for securing a rotor to a shaft which will also enable the rotor to be easily mounted and taken down.

It is yet another object of the present invention to provide means for securing a rotor to a shaft, which comprises a hollow cylindrical hub rendered integral at one end thereof with the rotor, a tubular protecting member pushed over the hub, and a gasket between the end of the latter member facing the rotor and that part of the plastic coating surface facing said end, there being provided a nut or similar means which is screwed on to the other end of the hub in such manner as to squeeze the member and the gasket against the rotor, and a second nut or similar means adapted to be screwed on to the first nut aforesaid which, for this purpose, is formed with an outer thread matching the inner thread of the aforesaid second nut, the latter being further provided with a part projecting radially towards the axis and adapted to be stopped in the course of its axial movement towards the rotor against a knockup or shoulder of the pump shaft. The complex comprising the rotor, the hollow cylindrical hub, the tubular member and the nut screwed thereon, is fixed to the shaft by placing the hub over the shaft itself and screwing the second nut on to the first nut, with the result that the abutment of the second nut against the shoulder of the shaft causes, as the second nut continues to be rotated, the penetration of the first nut into the second nut until such time as the hub, which, together with the rotor, follows the first nut in the axial movement, comes up against a second knockup on the shaft of the pump, there being provided means for rendering the hub, the tubular member and the second nut itself integral with the shaft in its rotation, and it being further provided that the two nuts are internally threaded in the same direction, i.e. in such a manner that the direction of their screwing home rotation is contrary to the direction of rotation of the shaft during the normal operation of the pump, the thread of the second nut having a greater pitch than the internal thread of the first nut which is screwed on to the hub.

With these and other objects in view, which will become apparent in the following detailed description, the present invention will be clearly understood in connection with the accompanying drawing, in which the only FIGURE is an axial section of a pump including a device for securing the rotor to the shaft in accordance with the present invention.

Referring now to the drawing, the pump comprises a rotor which includes a metal core 1 provided with an ebonite coating 1'.

A cylindrical, internally bored hub 2 provided with a longitudinal spline 3 is rigidly secured to the rotor A and, to this end, in the shown embodiment, the rotor A is screwed on to the end 2' of the hub 2 and, thereafter, held in position by means of dowels 4.

The core 1 of the rotor A and the hub 2 are made of material which is not resistant to the corrosive action of the liquid to be fed through the pump. The liquid may, for example, consist of a saline solution containing dissolved chlorine gas or HCl. Therefore, in order to protect the hub 2 of the rotor A, a sleeve consisting of a tubular member 5 of anti-acid material is provided. As may be seen in the drawing, the sleeve 5 extends over the whole length of that portion of the hub 2 which is disposed between the end threads 2' and 2" of the hub 2.

Between the end of the sleeve 5 facing the rotor A, and in particular the left hand end, as seen on the drawing and the portion of the ebonite covering wall 1' facing this end of the sleeve 5, there is provided a gasket 6 which is resistant to acid. The gasket 6 is squeezed by the sleeve 5 against the portion of the surface of the coating 1', as will be apparent hereinafter, and, thereby, protects the metal parts of the rotor A and prevents infiltrations of liquid.

In order to connect the hub 2 and the sleeve 5 to joint rotation, a key 19 engaging in the two last mentioned elements is provided.

There is also arranged a nut 7 which is screwed to the threaded end 2" of the hub 2, so as to urge the sleeve 5 against the gasket 6, in order to provide a good seal.

In order to connect the hub 2 with the shaft 8 of the rotor A for joint rotation, a key 9 is provided on the shaft 8 which is received in the slot 3 of the hub 2.

The nut 7 is also equipped with an outside thread 7' which matches the inner thread 10' of a second nut 10, adapted to fasten the members of the complex consisting of the rotor A, the hub 2, the sleeve 5 and the nut 7 to the shaft 8.

The shaft 8 is formed with an annular rib 11 and an annular shoulder 12, the nut 10 abutting the annular rib 11 and the hub 2 abutting the annular shoulder 13 in the process of securing these parts together as stated hereinbefore. The nut 10 has a radial passage 20 receiving a stop dowel 13.

There are also provided a packing ring 14 and a cover ring 15, each of the rings 14 and 15 being formed of two half rings and fastened to fixed parts of the pump. By removing one half ring of the cover 15, for instance the lower half, the dowel 13 is conveniently accessible. The direction of the inner thread is the same for the two nuts 7 and 10; for example, if the pump should rotate in a clockwise direction looking from the side opposite to the driving end, then the threads of the nuts 7 and 10 will be right-handed.

Moreover, for reasons which will more clearly appear hereinafter, the pitch of the thread of the nut 10 is greater than the pitch of the inner thread of the nut 7.

It is assumed, as an example only and without limiting the present invention, that the pitch of the inner thread of the nut 10 and that of the inner thread of the nut 7 are, respectively, 2 mm. and 1.5 mm.

In order to mount the rotor on the shaft 8, the cover 17 of the pump is taken off the fixed pump body 18 and the rotor A with its hub 2 and the sleeve 5 are outside of the pump body 18.

The rotor A, as stated hereinbefore, comprises a core 1 which has an ebonite coating 1', and is connected with the hub 2; the gasket 6 and the sleeve 5 are now inserted over the hub 2 so that the hub 2 and the sleeve 5 come into engagement by means of the key 19.

A second gasket is placed over the hub 2 at the threaded end 2" and the nut 7 is screwed on to the threaded end 2" of the hub 2.

When the nut 7 is tightened, the sleeve 5 is urged thereby against the gasket 6, which is thereby firmly gripped between the sleeve 5 and the rotor A.

The entire assembly is inserted into the pump body 18 and the hub 2 is moved over the shaft 8 in such manner as to provide an engagement with the shaft 8 by means of the key 9 which is received in the spline or slot 3 of the shaft 8.

If the nut 10 is turned, while the shaft 8 is held firm, it is screwed on to the nut 7.

More precisely, the nut 10 tends to move to the left, viewing the drawing, so that, when it abuts the rib 11, it stops its axial movement; if the nut 10 continues its turning, the nut 7 itself moves to the right, viewing the drawing, and thus enters into the nut 10.

The axial movement of the nut 7 in this direction transfers this movement to the whole assembly of the rotor A, namely the nut 7, the hub 2 and the sleeve 5.

The nut 10 continues then the turning until such time as the right hand end, viewing the drawing, of the hub 2 abuts the annular shoulder 12 of the shaft 8; the tightening of the nut 10 thus brings about the tightening of the hub 2 against the annular shoulder 12 and, hence, a firm securing of the rotor A to the shaft 8.

It should be noted that, since the directions of turning of the nut 10 on the nut 7 and of the nut 7 on the hub 2 are identical during the turning of the nut 10, there may be a greater tightening of the nut 7 and hence, of the gasket 6.

In order to ensure a lock between the nut 10 and the shaft 8, a set-dowel or set screw 13 is inserted into the passage 20 in such manner, that, when the set-dowel or set screw 13 is screwed into the passage 20, the inner pointed end of the set-dowel 13 penetrates slightly into the rib 11.

Once the rotor has been secured to the shaft 8 by the above stated means and the cover 17 has been secured to the pump body 18, the pump is ready for operation.

The suction and delivery orifices are indicated respectively by the letters A' and M.

During the operation of the pump, the rotor A, the hub 2, the sleeve 5 and the nuts 7 and 10 rotate jointly with the shaft 8 for the reasons set forth above.

By the arrangement set forth above, even if, for any reason, the shaft 8 were caused to rotate in the opposite direction to that of normal operation, the respective members of the entire assembly would remain in a position connected with each other.

Thus, the shaft 8 and the hub 2 are connected to joint rotation by means of the key 9; the sleeve 5 and the hub 2 are connected to joint rotation by means of the key 19; and the nut 10 is fastened to the shaft 8 by means of the set screw 13.

The nut 7 cannot likewise perform any movements relative to the shaft 8.

If the nut 10 tends to be loosened from the end 2" of the hub 2, by rotating in the proper direction, the nut 7 must screw itself further into the nut 10 and furthermore it must move towards the right, viewing the drawing, together with the hub 2.

More precisely, since the inner thread of the nut 10 is of greater pitch than the inner thread of the nut 7, when the latter performs an axial movement inside the nut 10, towards the right, viewing the drawing, there would be obtained an axial movement of the nut 7 in relation to the hub 2, which movement will be proportionate to the pitch of the nut 7 and also an axial movement of the assembly consisting of the nut 7 and the hub 2, which will be proportionate to the difference in the pitches in relation to the shaft 8.

The movement of the assembly of the nut 7 and the hub 2 is impossible, because the hub 2 is in engagement with the annular shoulder 12.

It is now supposed, for example, that the pitches of the nuts 7 and 10 are respectively 1.5 mm. and 2 mm.

In order to make an axial movement, e.g. of 2 mm. into the nut 10, the nut 7 would have to rotate in relation to the hub 2 and shift axially in relation thereto for a distance of 1.5 mm., to the right viewing the drawing; furthermore, for the remaining 0.5 mm. the assembly of the nut 7 and the hub 2 would have to shift to the right, viewing the drawing, since, in this movement, the nut 7 and the hub 2 are jointed for common rotation.

This movement of 0.5 mm. is impossible, as already stated, because of the annular shoulder 12 against which the hub 2 abuts.

If the rotor is to be disassembled, such operation can be performed with simplicity and rapidity.

If the pump is not in operation and the shaft 8 is held firm by the coupling 22, when the set screw 13 has been extracted, it is only necessary to unscrew the nut 10 from the nut 7 using a suitable tool.

At first the nut 10 will move to the right, viewing the drawing, until it engages the shoulder 23 of the cover 15. Thereafter, if the nut 10 continues its rotation, since it cannot shift axially on account of the shoulder 23, it is the nut 7 which will move to the left, viewing the drawing, together with the entire assembly of the rotor A, the hub 2 and the sleeve 5, which will thus be removed from the pump, provided that the cover 17 has been removed previously.

Besides the aforesaid function of keeping the hub 2, and hence the rotor A, in abutment against the annular shoulder 12 of the shaft 8 during operation, the nut 10 also serves as a means for extracting the rotor A, as set forth above.

The pump described hereinabove offers considerable advantages, such as the reliable securing of the rotor A and the sealing thereof, together with the facility of the operations of mounting and disassembling the rotor A itself. A further advantage resides in the fact, that the nut 7 not only cannot be loosened for reasons set forth above, but it can also be tightened at will from the outside, when the pump is not in operation, without removing any other part of the pump, with the exception of the packing ring 14, which is formed of two halves.

While I have disclosed one embodiment of the present invention, it is to be understood that this embodiment is given by way of example only and not in a limiting sense, the scope of the present invention being determined by the objects and the claims.

I claim:

1. A pump for fluids, including a rotor provided with a protective coating of plastic material, comprising
   a pump shaft,
   said rotor having said plastic coating and a hollow cylindrical hub secured at one end thereof to said rotor,
   a tubular protective member encircling said hub,
   a gasket disposed between the end of said tubular protective member facing said rotor and the part of the surface of said plastic coating facing said one end of said hub,
   a first nut having inner thread and outer thread screwed to the outer surface of the other end of said hub, thereby urging said tubular protective member and said gasket against said rotor,
   a second nut having inner thread screwed to said outer thread of said first nut,
   said pump shaft being set off at points axially spaced apart from each other and to form a first annular shoulder and a second annular shoulder,
   said second nut having an annular radially inwardly extending ring abutting said first annular shoulder of said pump shaft, in order to limit the axial movement of said second nut towards said rotor, whereby the assembly, consisting of said rotor, said hollow cylindrical hub, said tubular protective member and said first nut screwed on to the latter, is secured to said pump shaft by placing said hub on said pump and screwing said second nut on said first nut,
   so that upon abutment of said second nut against said first annular shoulder of said pump shaft during continued rotation of said second nut, said first nut penetrates into said second nut until said hub with said rotor, following the axial movement of said first nut, abuts against said second annular shoulder of said pump shaft,
   means connecting said hub, said tubular protective member and said second nut for joint rotation with said shaft, the inner thread of said first nut being in the same direction as the inner thread of said second nut and
   the direction of said inner threads of said first nut and of said second nut being contrary to the direction of rotation of said pump shaft during normal operation of said pump, and
   said inner thread of said second nut being of greater pitch than said inner thread of said first nut.

2. The pump for fluids, as set forth in claim 1, wherein said first annular shoulder comprises an annular rib integral with said pump shaft.

3. The pump for fluids, as set forth in claim 1, wherein said second annular shoulder is a set-off face of said pump, said set-off face being disposed perpendicularly to the axis of said pump,
   and the diameter of the latter being different at the opposite sides of said set-off face.

4. The pump for fluids, as set forth in claim 1, which includes
   a packing means surrounding said tubular protective member and a packing ring secured to said pump body and surrounding said tubular protective body, and said packing ring comprises two halves complementing each other.

5. The pump for fluids, as set forth in claim 1, wherein said means for connecting said hub and said tubular protective member and said second nut for joint rotation comprises a first key secured to said pump shaft and said hub having a longitudinal slot disposed on its inner surface and receiving said first key,
   and a second key secured to said hub, and said tubular protective member having a longitudinal slot disposed on its inner surface and receiving said second key,
   said second nut having a radial bore, and
   a set screw received in said bore and engaging with its inner end said pump shaft, in order to secure said second nut to said pump shaft.

6. The pump for fluids, as set forth in claim 5, which includes
   a pump body spaced apart from and surrounding said pump shaft,
   a cover ring surrounding said second nut and fastened to said pump body,
   said cover ring including an abutment face disposed perpendicularly to the axis of said pump shaft, and
   said abutment limiting an axial movement of said second nut in the direction away from said first abutment face of said pump shaft.

7. The pump for fluids, as set forth in claim 6, wherein said cover ring comprises two half rings complementing each other and divided by a plane passing through the axis of said cover ring.

References Cited in the file of this patent

UNITED STATES PATENTS

| 1,850,683 | Merrill | Mar. 22, 1932 |
| 1,912,408 | Schelhammer | June 6, 1933 |
| 2,181,973 | Jasberg | Dec. 5, 1939 |
| 2,232,648 | Allen | Feb. 18, 1941 |
| 2,658,454 | Greene | Nov. 10, 1953 |
| 2,811,339 | Osborne et al. | Oct. 29, 1957 |
| 2,865,299 | Hornschuch et al. | Dec. 23, 1958 |